(12) United States Patent
Nakamura

(10) Patent No.: US 6,981,103 B2
(45) Date of Patent: Dec. 27, 2005

(54) CACHE MEMORY CONTROL APPARATUS AND PROCESSOR

(75) Inventor: Satoko Nakamura, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 128 days.

(21) Appl. No.: 10/166,131

(22) Filed: Jun. 10, 2002

(65) Prior Publication Data

US 2002/0188810 A1 Dec. 12, 2002

(30) Foreign Application Priority Data

Jun. 11, 2001 (JP) .................................... 2001-175035

(51) Int. Cl.[7] .............................................. G06F 12/00
(52) U.S. Cl. ...................... 711/144; 711/118; 711/119; 711/123; 711/125; 711/126; 711/141
(58) Field of Search ................................ 711/118, 119, 711/123, 125, 126, 141, 144

(56) References Cited

U.S. PATENT DOCUMENTS

| | | | | |
|---|---|---|---|---|
| 5,577,227 A | * | 11/1996 | Finnell et al. | 711/122 |
| 6,092,172 A | * | 7/2000 | Nishimoto et al. | 711/207 |
| 6,295,582 B1 | * | 9/2001 | Spencer | 711/135 |
| 6,496,902 B1 | * | 12/2002 | Faanes et al. | 711/118 |
| 6,532,528 B1 | * | 3/2003 | Nishimoto et al. | 711/207 |

FOREIGN PATENT DOCUMENTS

| | | |
|---|---|---|
| JP | 05-012109 | 1/1993 |
| JP | 06-348600 | 12/1994 |
| JP | 11-39215 | 2/1999 |
| JP | 11-143777 | 5/1999 |

OTHER PUBLICATIONS

Roth, Digital Systems Design Using VHDL, 1998, PWS Publishing Company, p. 302–308.*
English Bibliography and Abstract of JP 05–012109 (cited above).
Japanese Patent Office Action of May 10, 2005.
English Translations of the indicated portions of the above-referenced Japanese Patent Office Action.

* cited by examiner

Primary Examiner—Donald Sparks
Assistant Examiner—Bao Q Truong
(74) Attorney, Agent, or Firm—Darryl G. Walker; Bradley T. Sako

(57) ABSTRACT

A cache memory control apparatus (20) that may control a cache memory (100) has been disclosed. Cache memory control apparatus (20) may include a control section (21). When a cache miss occurs, a refill request for a line (118) of data may be executed. In response to the refill request, control section (21) may perform control to make a valid bit (103) and a TAG portion (102), corresponding to line (118) of data to be refilled, invalid. This may occur while accessing the address corresponding to the cache miss from an external memory (200). In this way, if a reset occurs during the refill operation, a cache memory control apparatus (20) may recover a cache memory to a state before resetting in a reduced time period. Upon completion of the refill operation, valid bit (103) and TAG portion (102) may be updated.

9 Claims, 7 Drawing Sheets

CACHE MEMORY CONTROL APPARATUS AND PROCESSOR

TECHNICAL FIELD

The present invention relates generally to a cache memory control apparatus and processor and more particularly to a cache memory control apparatus and processor which may be used in portable information terminal devices or the like.

BACKGROUND OF THE INVENTION

When an instruction or operation is executed in a portable information terminal device, a CPU (central processing unit) can access an external memory. The system performance of CPUs has been improved so that there has been a desire for a CPU to acquire instruction data from an external memory faster, however, improvement of the performance of peripheral devices has not caught up with CPUs at present.

In order to address this problem, a cache memory can be installed to increase the system performance. A cache memory can be a fast memory such as a static random access memory (SRAM) that stores data between a CPU and main memory. In order to improve system performance, instruction data, which is frequently used, is stored in the cache memory.

If instruction data requested by a CPU is in cache memory, fast access is possible. A cache memory includes, for example, a memory area arranged with memory cells arranged in lines of data. A line of data can be accessed in accordance with an address match between an externally applied address and a TAG (address stored on the cache corresponding to the location of the line of data in main memory).

In a cache memory, instruction data which is located near an address that has been accessed once is likely to be subsequently accessed due to the time and spatial local property of a program. As the number of bits of data in a line of cache is increased, so that plural data request can be satisfied with access of a single line of data, system performance may be improved.

If data requested is not in the cache memory (cache miss), an external memory should be accessed. Such a cache miss, comes with a heavy speed penalty. When there is a cache miss, a refill data operation is performed in which a line of data in a cache is refilled with data from the main memory, including the data requested. If one line has a large amount of data at this time, the refill data provided from an external memory in response to a request from the CPU is increased, thus, system performance decreases. On the other hand, if one line of data is decreased, this refill time penalty decreases. However, as the data in a line decreases, the number of tags (used to verify data requested is in the cache) increases, thus increasing the area of the cache.

A conventional control apparatus for a cache memory having such characteristics will now be described with reference to FIG. 5. Referring to FIG. 5, a conventional cache memory control apparatus and cache memory is set forth in a circuit schematic diagram.

Conventional cache memory control apparatus 10 controls a cache memory 100 as one of various control functions of a CPU. Conventional cache memory apparatus 10 includes a control section 11, a comparator 107, a selector 114, an inverter 119, and an OR gate 400.

Cache memory 100 holds, for example, instruction data which is frequently used on the main memory by the CPU. Cache memory 100 includes a DATA portion 101, a TAG portion 102, and a valid bit 103. DATA portion 101 holds instruction data. TAG portion holds an address (main memory address) at which the instruction data is located. Valid bit 103 represents the validity (valid/invalid) of a line.

For example, when an address 104 for requesting reading of a line 118 of cache memory 100 is provided from control section 11, comparator 107 compares an address 105 read from TAG portion 102 for line 118 which is designated by lower bits of address 104 with upper bits 106 of the address 104. At the same time, valid bit 103 for line 118 is read. A hit/miss result signal 300 of a hit (hit/miss) is output to the control section 11. Hit/miss result signal 300 indicates a hit to control section 11 when valid bit 103 is valid and the comparison result is a match. Hit/miss result signal 300 indicates a miss to control section 11 when the valid bit 103 is invalid or the comparison result is not a match.

Hit/miss result signal 300 becomes active to indicate a miss. The miss is called a cache miss. At the time of a cache miss, an operation for reading data at the same address as the requesting address is executed on an external memory. The data read from the external memory is written into the cache memory in a refill process.

When the cache access is a hit, a read operation of DATA portion 101 is immediately executed. However, when the cache access is a miss, the read operation of DATA portion 101 is not performed until after the refill process is completed. Writing of the DATA portion 101 is executed in accordance with a write enable 121 of DATA portion 101 which is output from control section 11.

A write enable 108 for enabling/disabling writing of write data 113 to TAG portion 102 and valid bit 103 becomes active when control section 11 provides a refill end signal 111 or an invalid instruction signal 112 to OR gate 400. The refill end signal 111 indicates the end of a refill process and becomes active when the refill process is finished. Invalid instruction signal 112 indicates an instruction to make cache memory 100 invalid and becomes active when an instruction to make cache memory 100 invalid is made.

Data to be written in TAG portion 102 and valid bit 103 is write data 113. Either valid data 116 or invalid data 117 selected by a selector 114 becomes write data 113. Valid data 116 is data indicating an address to be written in the TAG portion 102 to be updated and the validity of a line to be written in valid bit 103. Invalid data 117 is data of "0" to be written in TAG portion 102 and valid bit 103.

Selector 114 is supplied with refill end signal 111 directly and through inverter 119 as a select signal. Selector 114 selects valid data 116 when refill end signal 111 is active (high level) and selects invalid data 117 when refill end signal 111 is inactive (low level).

Control section 11 generates a refill data request signal 110. Refill data request signal 110 requests refill data from an external memory (not illustrated) at the time of a cache miss. When refill data request signal 110 becomes active, refill data is requested.

Next, the operation of a conventional refill process at the time of a cache miss will be describe with reference to FIG. 6. Referring now to FIG. 6, a block diagram showing the connection structure of a cache memory 100 incorporated in a CPU 130 and an external memory 200. Constituents in FIG. 6 having corresponding constituents in FIG. 5 are referred to by the same reference character. It is assumed that cache memory control apparatus 10 of FIG. 5 is incorporated in CPU 130.

In FIG. 6, in a case where CPU 130 accesses an external device such as a memory (external memory 200, in this example), a BIU (bus interface unit) 201 interfaces with address data 202. When a miss occurs in line 118 (for example) of cache memory 100, refill data request signal 110 becomes active. The active refill data request signal 110 is sent to BIU 201 via a bus 203 and on to external memory 200 via a system bus 204.

In external memory 200, refill data 205 at an address (202) is read to provide refill data 205 to BIU 201 via a system bus 206. Refill data 205 may then be provided to cache memory 100 from BIU 201 via a bus 207 and written into DATA portion 101. At this time, TAG portion 102 and valid bit 103 for line 118 (where the miss occurred) are updated at the same time as the last of the refill data is written.

Referring to FIG. 7, a timing diagram illustrating timings of individual data at the time of a conventional refill operation is set forth.

The timing diagram of FIG. 7 illustrates a clock 1 shown as (a), a cache miss 300 shown as (b), a refill data request 110 to external memory shown as (c), an address 202 on cache shown as (d), an address 202 received by BIU shown as (e), a clock 2 shown as (f), a system bus 204 (BIU to memory) shown as (g), a system bus 206 (external memory to BIU) shown as (h), data 205 received by BIU shown as (i), data 205 on BIU—cache bus shown as a write enable 121 to cache data portion shown as (k), write data 113 to cache TAG portion 102 and valid bit 103 shown as (1), and write enable 108 to cache TAG portion 102 and valid bit 103 shown as (m).

Referring to FIG. 7 in conjunction with FIGS. 5 and 6, it is assumed that CPU 130 is operating with clock 1 shown as (a) in FIG. 7. Assuming that comparator 107 which generates hit/miss result signal 300 judges that access of line 118 of cache memory 100 is a miss (TAG data 102 does not match address received), hit/miss result signal 300 shown as (b) becomes active (high) indicating that a cache miss has been detected. CPU 130 receives the active hit/miss result signal 300.

Then, in a period S1, CPU 130 sends refill data request signal (pulse signal) 110 to BIU 201 to request refill data from external memory 200 at a miss-occurred address (202) shown as (c). Also in period S1, cache memory 100 outputs the miss-occurred address (202) to bus 203, illustrated as (d) in FIG. 7, to BIU 201. In BIU 201, address (202) is received in synchronism with clock 1 (shown as (e) in FIG. 7) of a period S2.

Further, in a period S3, a clock 2 (shown as (f) in FIG. 7), which is a frequency-divided version of clock 1, is output to system bus 204 that connects BIU 201 to external memory 200 (shown as (g) in FIG. 7).

Then, when refill data 205 from address (202) in external memory 200 is returned to BIU 201 via system bus 206 (shown as (h) to (j) in periods S4 to S7), CPU 130 outputs write enable 121 to DATA portion 101 (shown as (k) in FIG. 7). In this way, refill data 205 is written to DATA portion 101 in the returned order in periods S8 to S11.

In period S11, the last refill data 3 is written and write enable 108 is output (shown as (m) in FIG. 7), after which TAG portion 102 and valid bit 103 are updated with write data 113 (shown as (l) in FIG. 7).

In the conventional cache memory control apparatus, however, there may be a case where, for example, a portable information terminal device to which cache memory control apparatus 10 is adapted will not recover for some factors unless the CPU is reset. Resetting may be made at various timings.

There is a case where resetting can be done in a state to be described below at the time of performing a refill process for a cache miss. Because in the above-described conventional approach 16 bytes of data returned in several clocks from external memory 200, there is a case where resetting may be done in a state where some of the data previously returned in periods S4 to S6 has been written in DATA portion 101 and the remaining data and TAG portion 102 have not been updated.

At this time, if a TAG of the previous line is valid, the refill data already written becomes data with respect to the previous valid TAG and the contents of that line are not valid or in error. After reset recovery, therefor, it is not known which line has the erroneous data.

Because of the reason above, when resetting is done, all lines of cache memory 100 are made invalid in the conventional approach. In this case, to make the $1^{st}$ through $1024^{th}$ line invalid, for example, a loop of making the $1^{st}$ line invalid, incrementing the address and determining if the address is the $1024^{th}$ line is carried out until al lines are made invalid. This approach would take several hundred clock cycles. Valid data that have been in lines other than the miss-loaded (incompletely loaded) line before resetting is done are all made invalid.

Therefore, there may be a case where cache memory 100 cannot be recovered to the state before the resetting operation, and even if recovery were possible, it would take considerable time.

In view of the above discussion, it would be desirable to provide a cache memory control apparatus and a processor, which may recover a cache memory to a state before resetting as quickly as possible even if resetting is done when refilling data in response to a cache miss.

SUMMARY OF THE INVENTION

According to the present embodiments, a cache memory control apparatus that may control a cache memory is disclosed. A cache memory control apparatus may include a control section. When a cache miss occurs, a refill request for a line of data may be executed. In response to the refill request, a control section may perform control to make a valid bit and a TAG portion, corresponding to a line of data to be refilled, invalid. This may occur while accessing the address corresponding to the cache miss from an external memory. In this way, if a reset occurs during the refill operation, a cache memory control apparatus may recover a cache memory to a state before resetting in a reduced time period. Upon completion of the refill operation, the valid bit and TAG portion may be updated.

According to one aspect of the embodiments, a cache memory control apparatus for controlling read/write of data from/to a cache memory including multiple lines for storing data may include a control circuit. When a cache miss occurs, the control circuit may provide a read request to an external memory from a cache miss address. The control circuit may make a first line in the cache memory, where refill data from the external memory is to be stored, invalid.

According to another aspect of the embodiments, the control circuit may make the first line valid when the refill data is stored in the first line.

According to another aspect of the embodiments, the cache memory apparatus may be included on a processor device.

According to another aspect of the embodiments, the control circuit may set a valid bit corresponding to the first line in the cache memory to an invalid state in response to the cache miss.

According to another aspect of the embodiments, the control circuit may set a TAG address corresponding to the first line in the cache memory to an invalid address state in response to the cache miss.

According to another aspect of the embodiments, the control circuit may set a TAG address corresponding to the first line in the cache memory to the cache miss address when the refill data is stored in the first line.

According to another aspect of the embodiments, the control circuit may set a valid bit corresponding to the first line in the cache memory to a valid state when the refill data is stored in the first line.

According to another aspect of the embodiments, a cache memory apparatus for controlling a cache memory including multiple lines for storing data may include a control circuit. The control circuit may provide a cache refill request to an external memory from a cache miss address in response to a cache miss. The control circuit may set a valid bit corresponding to a first line in the cache memory where refill data from the external memory is to be stored to an invalid state in response to the cache miss.

According to another aspect of the embodiments, the control circuit may provide a refill end signal. The valid bit corresponding to the first line in the cache memory may be set to a valid state in response to the refill end signal.

According to another aspect of the embodiments, an address valid may be written into a TAG address corresponding to the first line in the cache memory in response to the refill end signal.

According to another aspect of the embodiments, an address value may be written into a TAG address corresponding to the first line in the cache memory in response to the cache refill request.

According to another aspect of the embodiments, first write data may be selectively applied to the cache memory in response to a refill end signal.

According to another aspect of the embodiments, the control circuit may provide a refill request signal. Second write data may be selectively applied to the cache memory in response to the refill request signal.

According to another aspect of the embodiments, the cache memory may be included in a processor on an integrated circuit.

According to another aspect of the embodiments, a method for controlling a cache memory including multiple lines for storing data may include the steps of receiving a cache miss indication, providing a refill request to refill a first line of the cache memory, and setting a first line invalid state for the first line of the cache memory in response to the refill request.

According to another aspect of the embodiments, the method for controlling a cache memory may include the step of setting the first line of the cache memory to a first line valid state in response to a refill end.

According to another aspect of the embodiments, the method for controlling a cache memory may include the step of writing an address value corresponding to at least a portion of a refill request address provided to an external memory during the refill request to a TAG portion for the first line of the cache memory in response to the refill end.

According to another aspect of the embodiments, method for controlling a cache memory may include the step of writing an invalid address value to the TAG portion for the first line of the cache memory in response to the refill request.

According to another aspect of the embodiments, method for controlling a cache memory may include the step of writing an address value corresponding to at least a portion of a refill request address provided to an external memory during the refill request to a TAG portion for the first line of the cache memory in response to the refill request.

According to another aspect of the embodiments, the method for controlling a cache memory may include steps performed on an integrated circuit including a processor.

DETAILED DESCRIPTION OF THE EMBODIMENTS

Various embodiments of the present invention will now be described in detail with reference to a number of drawings.

Figure 1:
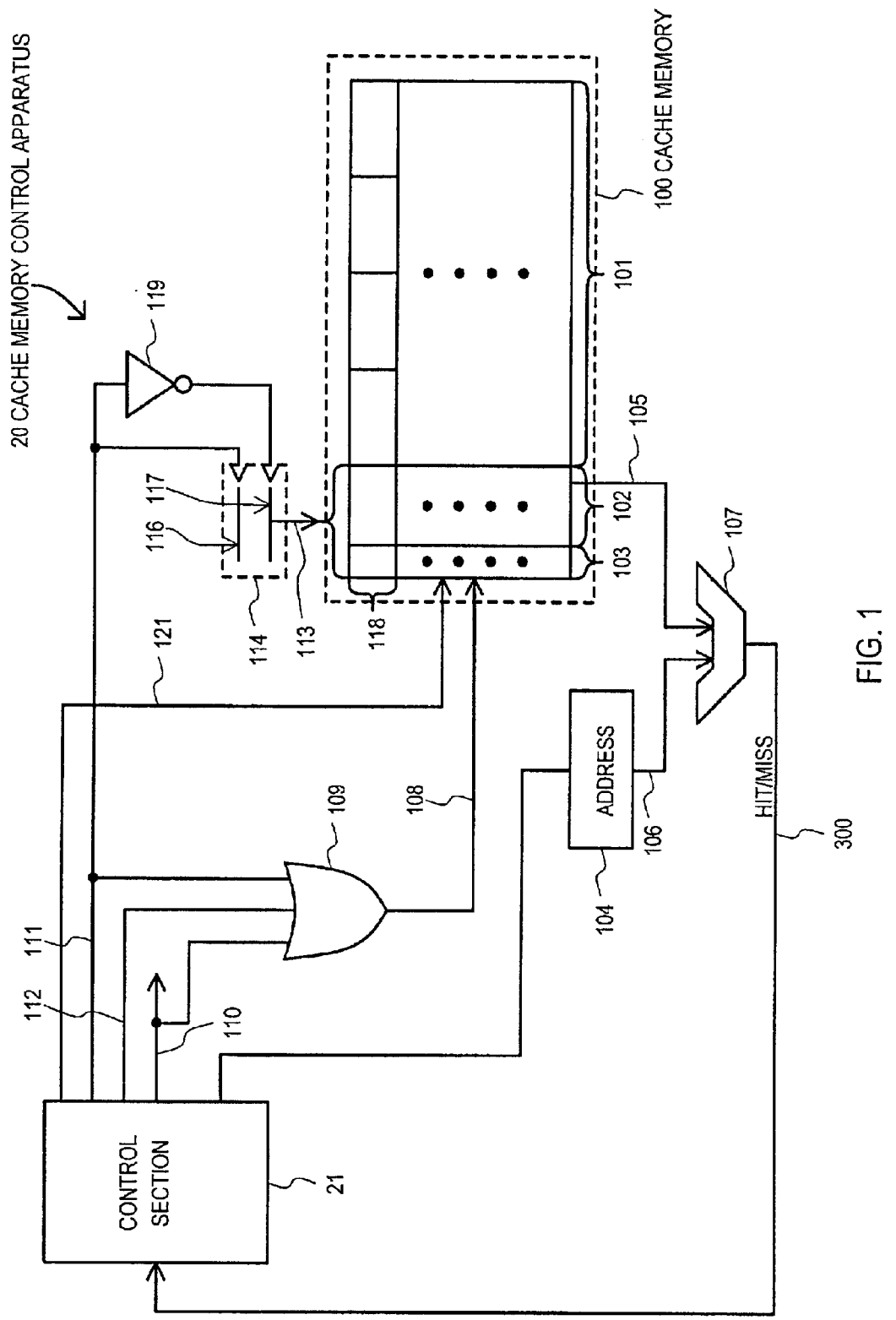
FIG. 1 is a circuit schematic diagram of a cache memory control apparatus controlling a cache memory according to one embodiment.
Figure 5:
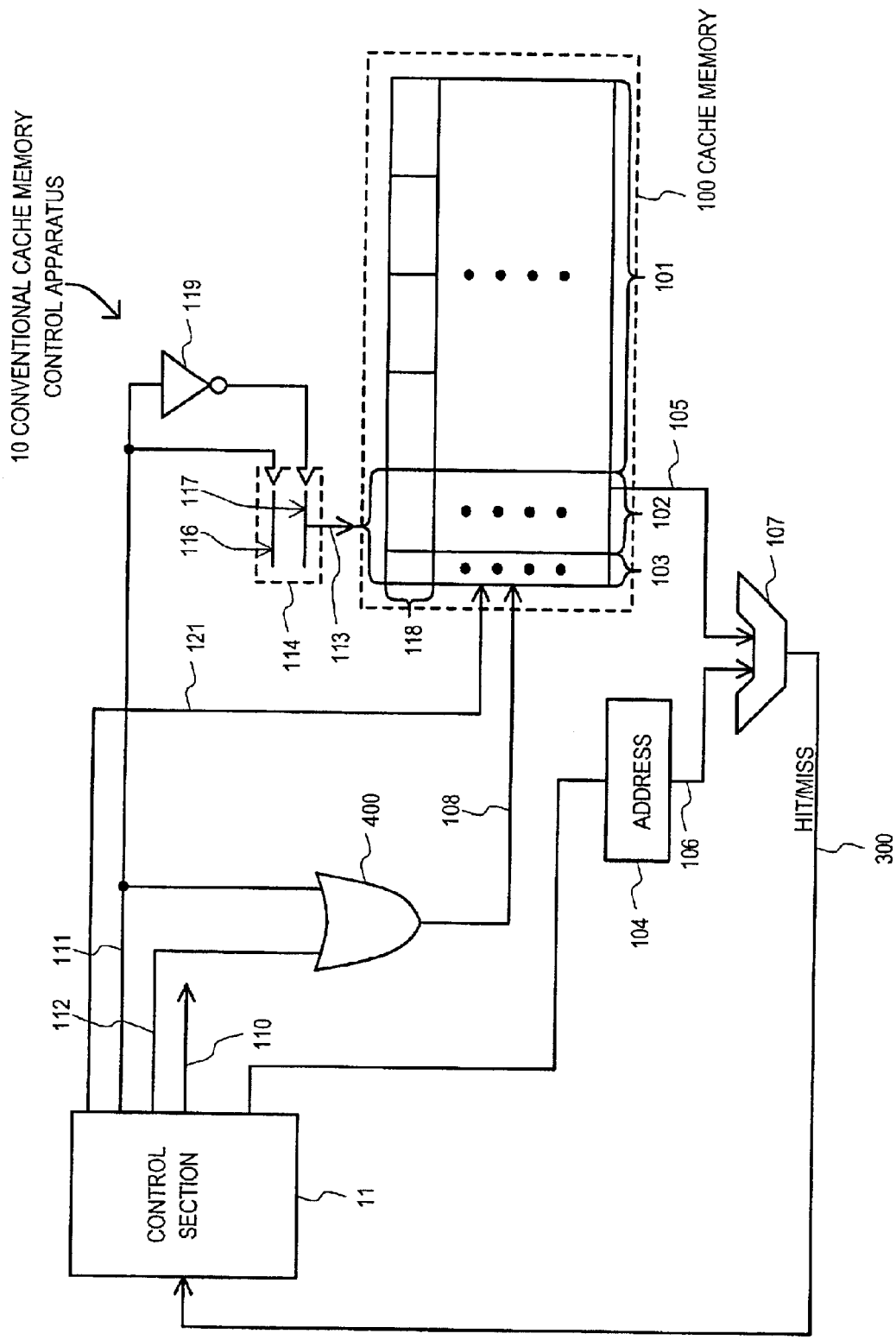
FIG. 5 is a circuit schematic diagram of a conventional cache memory control apparatus and cache memory.

Referring now to FIG. 1, a circuit schematic diagram of a cache memory control apparatus controlling a cache memory is set forth according to an embodiment. FIG. 1 may include similar constituents as FIG. 5, such constituents may be given the same general reference character.

As illustrated in FIG. 1, cache memory control apparatus 20 may control a cache memory 100 as one of various functions of a CPU (central processing unit). Cache memory control apparatus 20 may include a control section 21, a comparator 107, a selector 114, an inverter 119 and an OR gate 109.

Cache memory 100 may store, for example, instruction data (from main memory) which may be frequently accessed by the CPU. Cache memory 100 may include a DATA portion 101, a TAG portion 102, and a valid bit 103. DATA portion 101 may store the instruction data. TAG portion 102 may store an address (main memory address) at which the instruction data is located. Valid bit 103 may represent the validity (valid/invalid) of a line of a corresponding line of data stored on cache memory 100.

When an address 104, for example, requesting reading a line 118 of cache memory 100 is provided from control section 21, comparator 107 may compare an address 105 read from TAG portion 102 corresponding to line 118 (designated by lower bits of address 104) with upper bits 106 of address 104. At the same time, valid bit 103 corresponding to line 118 in cache memory 100 may be read. A hit/miss result signal 300 may be output to control section 21. Hit/miss result signal 300 may indicate a hit to control section 21 when valid bit 103 is valid and the comparison result indicates a match. Hit/miss result signal 300 may indicate a miss to control section 21 when valid bit 103 is invalid or the comparison result indicates a match did not occur. Hit/miss result signal 300 may become active to indicate a miss.

When the hit/miss result signal 300 indicates a hit, reading of a line of data from DATA portion 101 may be performed immediately. However, when hit/miss result signal 300 indicates a miss, reading of a line of data from DATA portion 101 may be performed after a refill process. Reading of a line of data from DATA portion 101 may be executed in accordance with a read/write enable 121. Read/write enable 121 may be provided from control section 21.

A write enable 108 may become active when a refill data request signal 110, a refill end signal 111 or an invalid instruction signal 112 provided from control section 21 to OR gate 109 becomes active. Write enable 108 may enable/disable writing of write data 113 to TAG portion 102 and valid bit 103.

Refill data request signal 110 may provide a request from control section 21 to an external memory (not shown) to provide refill data. Refill data request signal 110 may become active when a refill data operation is requested. Refill end signal 111 may indicate the end of a refill operation. Refill end signal 111 may become active when a refill process or operation is completed. Invalid instruction signal 112 may indicate an instruction to make cache memory 100 invalid. Invalid instruction signal 112 may become active when an instruction to make cache memory 100 invalid is executed.

Write data 113 may be written in TAG portion 102 and valid bit 103. Either valid data 116 or invalid data 117 may be selected by selector 114 as write data 113. Valid data 116 may indicate an address to be written in TAG portion 102 to be updated and the validity value to be written in valid bit 103. The validity value to be written in valid bit 103 may indicate a validity of a corresponding line of data written in data section 101. Invalid data 117 may be a data value of "0" to be written in TAG portion 102 and valid bit 103.

Selector 114 may be supplied with refill end signal 111 directly and through inverter 119 as a select signal. Selector 114 may select valid data signal 116 when refill end signal 111 is active (high level) and may select invalid data 117 when refill end signal 111 is inactive (low level).

Characteristics of the embodiment of FIG. 1 will now be discussed. In the embodiment of FIG. 1, control section 21 may provide an active refill data request signal 110 at a time of requesting refill data subsequent to a cache miss. Control section 21 may also provide the active data request signal 110 to OR gate 109 to make write enable 108 active.

At this time, because refill end signal 111 provided by control section 21 may not be active due to the refill process/operation not being completed, selector 114 may select "0" of invalid data 117 and write data 113 may be set to "0" (invalid). In this way, valid bit 103 and TAG portion 102 may be written with "0" and a line of data from the cache miss may be made invalid.

Next, the operation of the refill process when there is a cache miss will be described by referring to FIG. 6. In the schematic diagram of FIG. 6 it is assumed that cache memory control apparatus 20 of FIG. 1 is incorporated in CPU 130.

Figure 6:
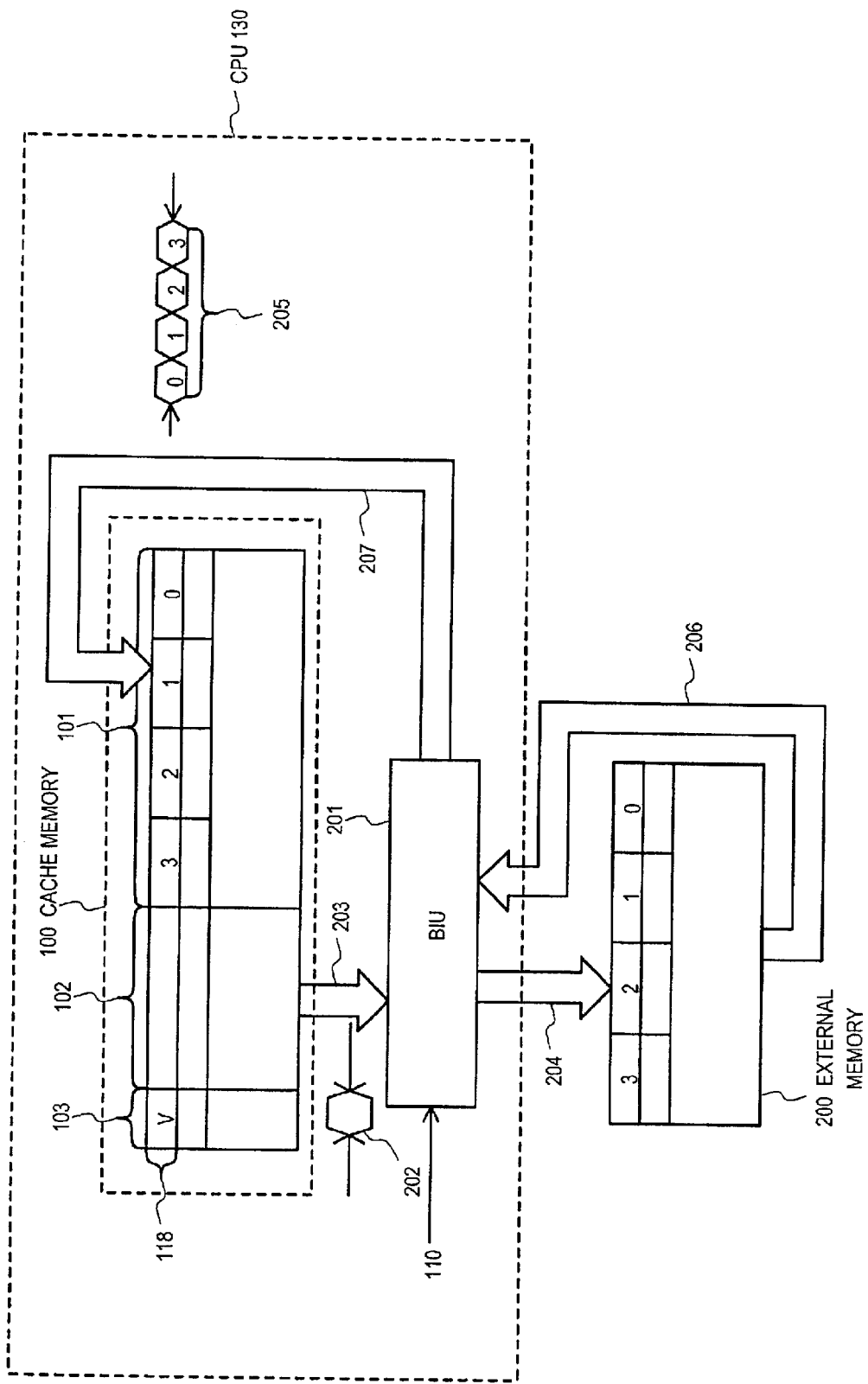
FIG. 6 is a block schematic diagram showing the connection structure of a cache memory incorporated in a CPU and an external memory.
Figure 7:
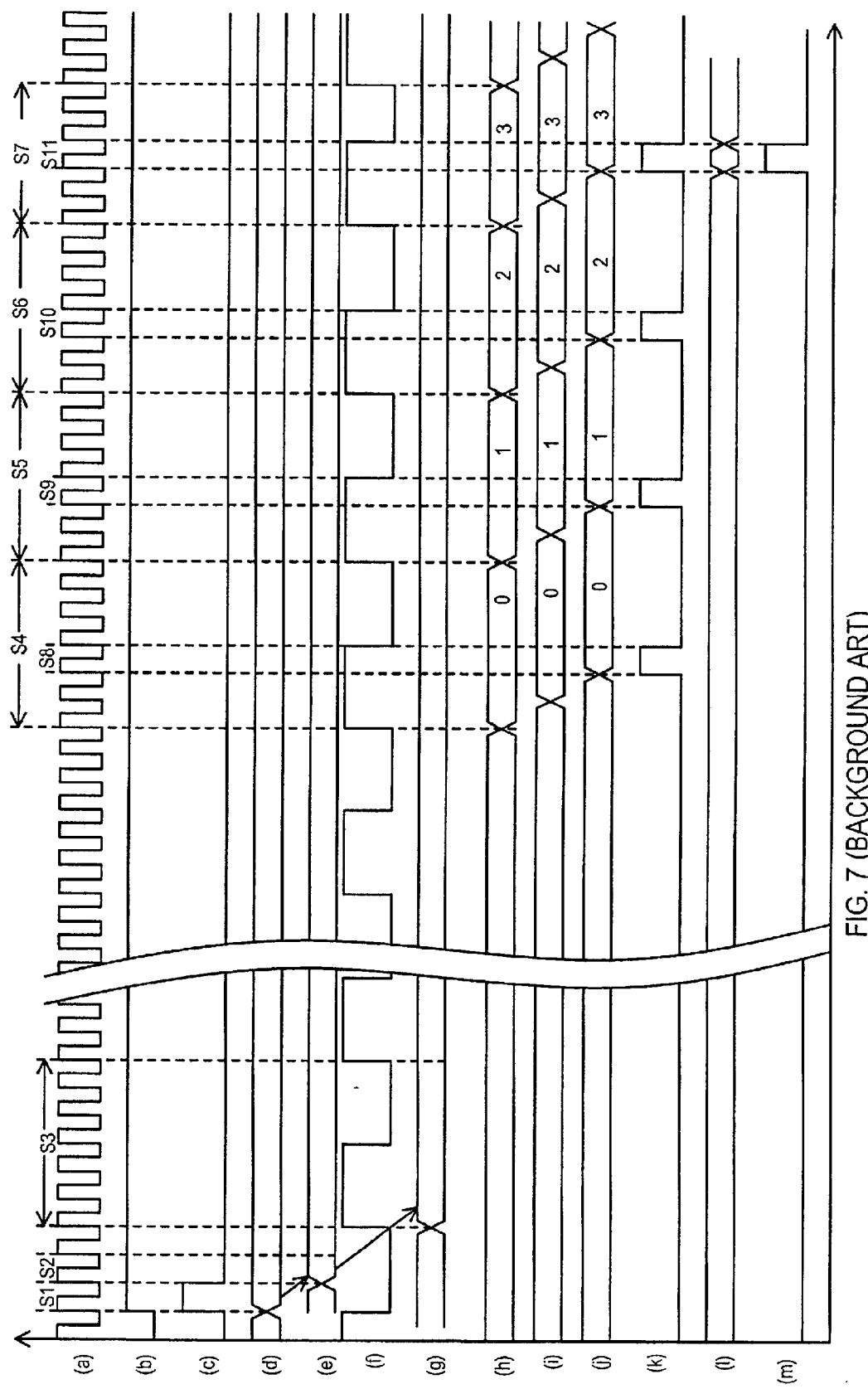
FIG. 7 is a timing diagram illustrating a conventional refill operation.

In FIG. 6, in a case where CPU 130 accesses external memory 200, a BIU (bus interface unit) 201 may perform an interface with address data 202. When a cache miss occurs for line 118 of cache memory 100, refill data request signal 110 may become active. The active refill data request signal 110 may be sent to BIU 201 via a bus 203 and on to external memory 200 via a system bus 204. An address (202) corresponding to the address of the cache miss may be provided to BIU 201 via bus 203 and then to external memory 200 via system bus 204.

In external memory 200, refill data 205 at an address (202) may be read. Refill data 205 may be provided to BIU 201 via system bus 206. Refill data 205 may then be provided to cache memory 100 from BIU 201 via bus 207 and written into DATA portion 101. At this time, TAG portion 102 and valid bit 103 for line 118 (where the cache miss occurred or where control section 21 determines refill should take place) may be updated at about the same time as last of refill data 205 is written.

Figure 2:
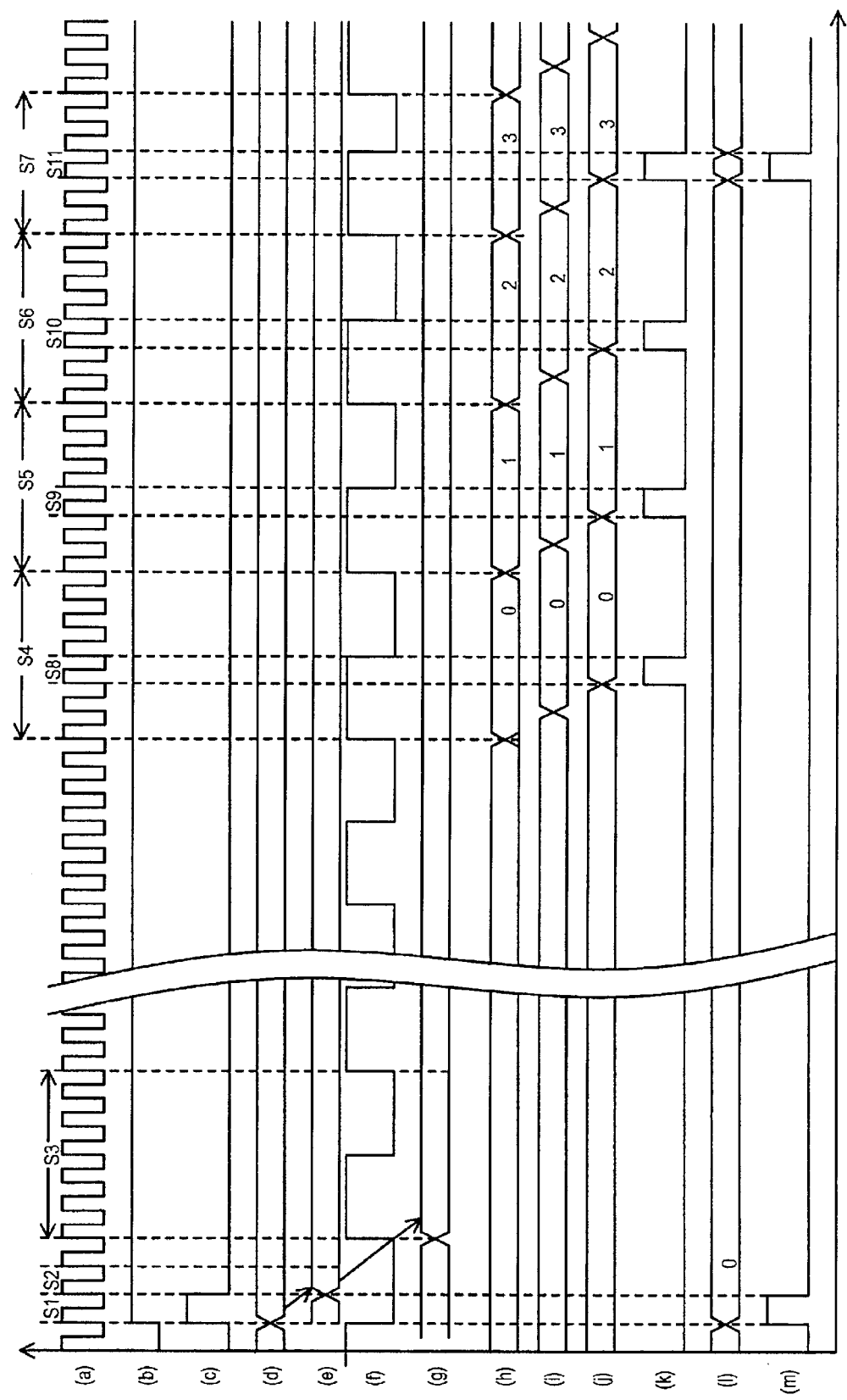
FIG. 2 is a timing diagram a refill operation according to an embodiment.

Referring now to FIG. 2, a timing diagram of individual data at the time of a refill operation according to the embodiment of FIG. 1 is set forth.

The timing diagram of FIG. 2 may include a clock 1 shown as (a), a cache miss 300 shown as (b), a refill data request 110 to external memory shown as (c), an address 202 on cache shown as (d), an address 202 received by BIU shown as (e), a clock 2 shown as (f), a system bus 204 (BIU to memory) shown as (g), a system bus 206 (external memory to BIU) shown as (h), data 205 received by BIU shown as (i), data 205 on BIU—cache bus shown as a write enable 121 to cache data portion shown as (k), write data 113 to cache TAG portion 102 and valid bit 103 shown as (l), and write enable 108 to cache TAG portion 102 and valid bit 103 shown as (m).

In the example, it is assumed that CPU 130 is operating with a clock 1 (shown as (a) in FIG. 2). Comparator 107 may make a cache hit/miss judgment. Assuming comparator 107 judges that line 118 of cache memory 100 is a cache miss in this case, hit/miss result signal 300 (shown as (b) in FIG. 2) may become active (high) to indicated that a cache miss has been detected. The high value of hit/miss result signal 300 may be provided to CPU 130.

Then in a period S1, CPU 130 may provide BIU 201 a refill data request signal (pulse signal) 110 (shown as (c) in FIG. 2) and may request refill data from external memory 200 from the address (202) providing the cache miss.

At essentially the time as refill data request signal 110 (pulse signal) is output, OR gate 109 may provide a high write enable 108 (shown as (m) in FIG. 2). Accordingly, invalid data ("0" value) 117 may be written into TAG portion 102 and valid bit 103 corresponding to line 118. In this way, line 118 of cache memory 100 may become invalid. In contrast, at this time in the conventional approach, valid bit 103 has not been made invalid and TAG portion 102 still holds the previous address (before refill data request) of the line 118.

Also in period S1, cache memory 100 may output the address (202) corresponding to the cache miss to bus 203 (shown as (d) in FIG. 2). In a subsequent cycle of clock 1, shown as period S2, BIU 201 may latch (or receive) address (202). In a period S3, clock 2 (shown as (f) in FIG. 2) may trigger BIU 201 to output address (202) to system bus 204 (shown as (g) in FIG. 2). In this way, external memory 200 may receive address (202). Clock 2 may be a frequency divided version of clock 1.

Then, in periods S4 to S7, refill data 205 corresponding to address (202) may be returned to BIU 201 from external memory 200 via system bus 206 (shown as (h) to (j) in FIG. 2). Also during periods S4 to S7, CPU 130 may output a write enable 121 (shown as (k) in FIG. 2) so that refill data 205 may be written into DATA portion 101 in the returned order in periods S8 to S11.

In period S11, the last refill data (3) may be written into data portion 101 and write enable 108 (shown as (m) in FIG. 2) may become active. In this way, TAG portion 102 and valid bit 103 corresponding to line 118 may be updated with write data 113 (shown as (l) in FIG. 2).

According to cache memory control apparatus 20 of this embodiment, as apparent from the above, when a cache miss occurs in a line (for example line 118), valid bit 103 and TAG portion 102 for the line 118 (line where the cache miss occurred or control section 31 determines line to be updated) may be made invalid. Valid bit 103 and TAG portion 102 may be updated with write data 113 and thus made valid when refill data 205 has been written into the corresponding line 118. Valid bit 103 and TAG portion 102 may be updated under control of control section 21.

By making the line 118 where the cache miss occurred invalid (essentially at the time of the cache miss), even if resetting is done during writing of refill data 205, a partial line fill of refill data would not erroneously become valid cache data in the cache line (unlike in the conventional approach). In this way, cache data integrity may be maintained. Thus, a cache memory control apparatus 20 according to an embodiment may eliminate the necessity of making all lines of cache memory 100 invalid when resetting is done and the cache memory 100 may be recovered to the state before resetting in a shorter period of time.

In another embodiment, when a cache miss occurs, valid bit 103 corresponding to the line where the miss occurred (for example line 118) may be made invalid. At this time, after an address in TAG portion 102 is updated, data at the requested address may be read from external memory 200 into line 118. Then, valid bit 103 corresponding to line 118 may be made valid. Such an embodiment will now be described with reference to FIG. 3.

Figure 3:
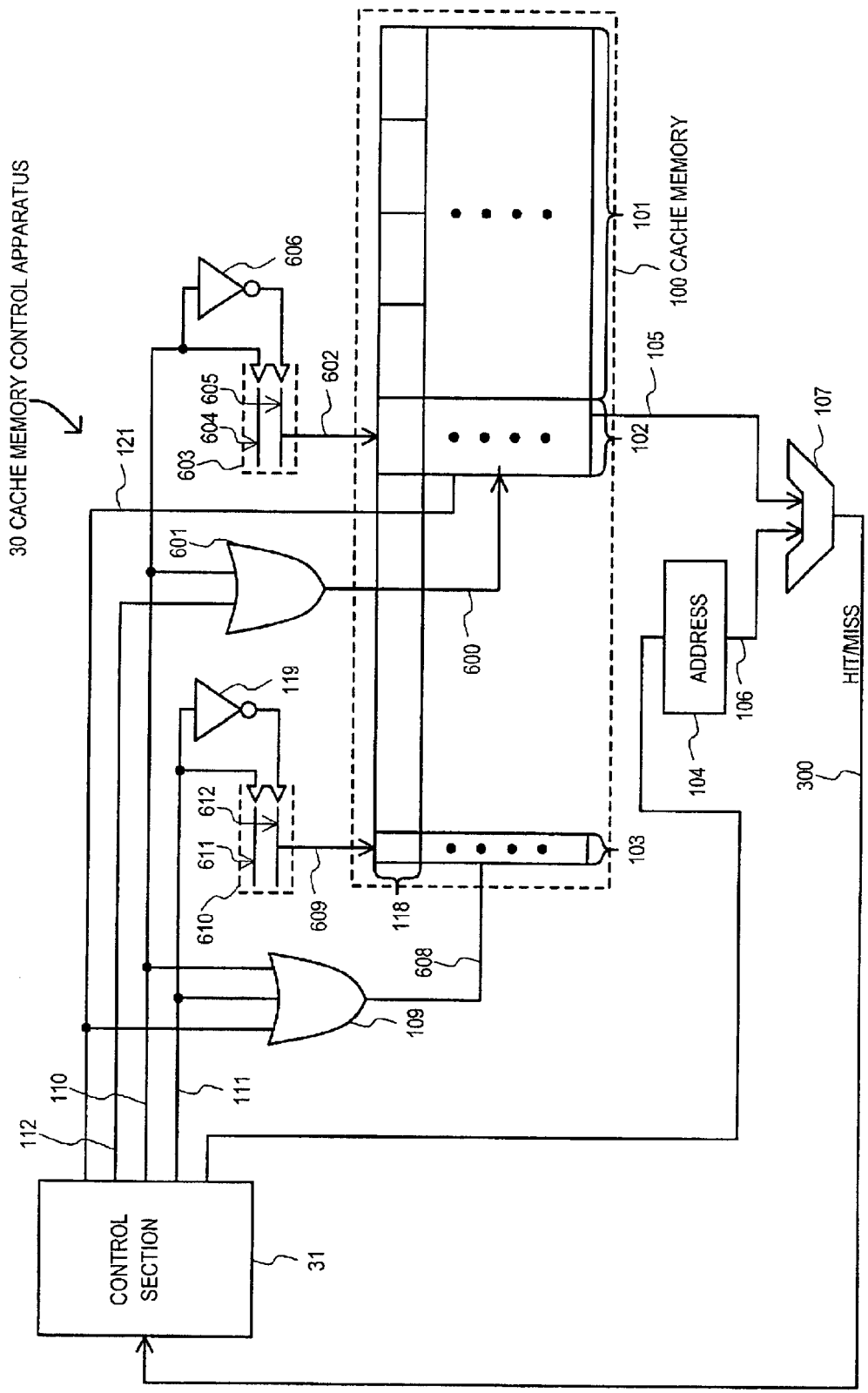
FIG. 3 is a circuit schematic diagram of a cache memory control apparatus controlling a cache memory according to an embodiment.

Referring now to FIG. 3, a circuit schematic diagram of a cache memory control apparatus controlling a cache memory is set forth according to an embodiment. FIG. 3 may include similar constituents as FIG. 1, such constituents may be given the same general reference character.

As illustrated in FIG. 3, cache memory control apparatus 30 may control a cache memory 100 as one of various functions of a CPU (central processing unit). Cache memory control apparatus 30 may include a control section 31, a comparator 107, selectors (603 and 610), inverters (119 and 606) and OR gates (109 and 601).

When an address 104, for example, requesting reading a line 118 of cache memory 100 is provided from control section 31, comparator 107 may compare an address 105 read from TAG portion 102 corresponding to line 118 (designated by lower bits of address 104) with upper bits 106 of address 104. At the same time, valid bit 103 corresponding to line 118 in cache memory 100 may be read. A hit/miss result signal 300 may be output to control section 31. Hit/miss result signal 300 may indicate a hit to control section 31 when valid bit 103 is valid and the comparison result indicates a match. Hit/miss result signal 300 may indicate a miss to control section 31 when valid bit 103 is invalid or the comparison result indicates a match did not occur. Hit/miss result signal 300 may become active to indicate a miss.

When the hit/miss result signal 300 indicates a hit, reading of a line of data from DATA portion 101 may be performed immediately. However, when hit/miss result signal 300 indicates a miss, reading of a line of data from DATA portion 101 may be performed after a refill process. Reading of a line of data from DATA portion 101 may be executed in accordance with a read/write enable 121. Read/write enable 121 may be provided from control section 31.

A write enable 600 may become active when a refill data request signal 110 or an invalid instruction signal 112 provided from control section 31 to OR gate 601 become active. Write enable 600 may enable/disable writing of write data 602 to TAG portion 102.

Refill data request signal 110 may provide a request from control section 31 to an external memory (not shown) to provide refill data. Refill data request signal 110 may become active when a refill data operation is requested. Invalid instruction signal 112 may indicate an instruction to make cache memory 100 invalid. Invalid instruction signal 112 may become active when an instruction to make cache memory 100 invalid is executed.

A write enable 608 may become active when a refill data request signal 110, a refill end signal 111 or an invalid instruction signal 112 provided from control section 31 to OR gate 109 become active. Write enable 608 may enable/disable writing of write data 113 to valid bit 103. Refill end signal 111 may indicate the end of a refill operation. Refill end signal 111 may become active when a refill process or operation is completed.

Write data 602 may be written in TAG portion 102. Either valid data 604 or invalid data 605 may be selected by selector 603 as write data 602. Valid data 604 may indicate an address to be written in TAG portion 102 to be updated. Invalid data 605 may be a data value of "0" to be written in TAG portion 102.

Selector 603 may be supplied with refill data request signal 110 directly and through inverter 606 as a select signal. Selector 603 may select valid data signal 604 when refill data request signal 110 is active (high level) and may select invalid data 605 when refill data request signal 110 is inactive (low level).

Write data 609 may be written in valid bit 103. Either valid data 611 or invalid data 612 may be selected by selector 610 as write data 609. Valid data 611 may indicate a validity value to be written in valid bit 103. The validity value to be written in valid bit 103 may indicate a validity of a corresponding line of data written in data section 101. Invalid data 612 may be a data value of "0" to be written in valid bit 103.

Selector 610 may be supplied with refill end signal 111 directly and through inverter 119 as a select signal. Selector 610 may select valid data signal 611 when refill end signal 111 is active (high level) and may select invalid data 612 when refill end signal 111 is inactive (low level).

When requesting refill data in response to a cache miss, control section 31 may activate refill data request signal 110. OR gates (109 and 601) may receive the active refill data request signal 110 and may activate respective write enables (608 and 609).

At this time, the active refill data request signal 110 may be supplied to selector 603 as a select signal. In this way, selector 603 may select valid data 604 and an address may be written in TAG portion 102. The address written in TAG portion 102 may correspond to an address location (in a main memory) of refill data written into the updated line 118 of cache memory 100.

Further, at this time, because the refill process has not finished, control section 31 may provide a refill end signal 111 that is not active (inactive). In response to an inactive refill end signal 111, selector 610 may select invalid data 612 as write data 609. In this way, valid bit 103 (corresponding to line 118 of cache memory 100 to be refilled) may be set to 0. That is, only the line 118 of cache memory 100 to be refilled has its corresponding valid bit 103 set to an invalid state. The valid bit 103 for other lines of cache memory 100 may remain unchanged.

Next, the operation of the refill process when there is a cache miss will be described by referring to FIG. 6. In the schematic diagram of FIG. 6 it is assumed that cache memory control apparatus 30 of FIG. 3 is incorporated in CPU 130.

In FIG. 6, in a case where CPU 130 accesses external memory 200, a BIU (bus interface unit) 201 may perform interface with address data 202. When a cache miss occurs for line 118 of cache memory 100, refill data request signal 110 may become active. The active refill data request signal 110 may be sent to BIU 201 via a bus 203 and on to external memory 200 via a system bus 204. An address (202) corresponding to the address of the cache miss may be provided to BIU 201 via bus 203 and then to external memory 200 via system bus 204.

In external memory 200, refill data 205 at an address (202) may be read. Refill data 205 may be provided to BIU 201 via system bus 206. Refill data 205 may then be provided to cache memory 100 from BIU 201 via bus 207 and written into DATA portion 101. At this time, valid bit 103 for line 118 (where the cache miss occurred or where control section 31 determines refill should take place) may be updated at about the same time as last of refill data 205 is written.

Figure 4:
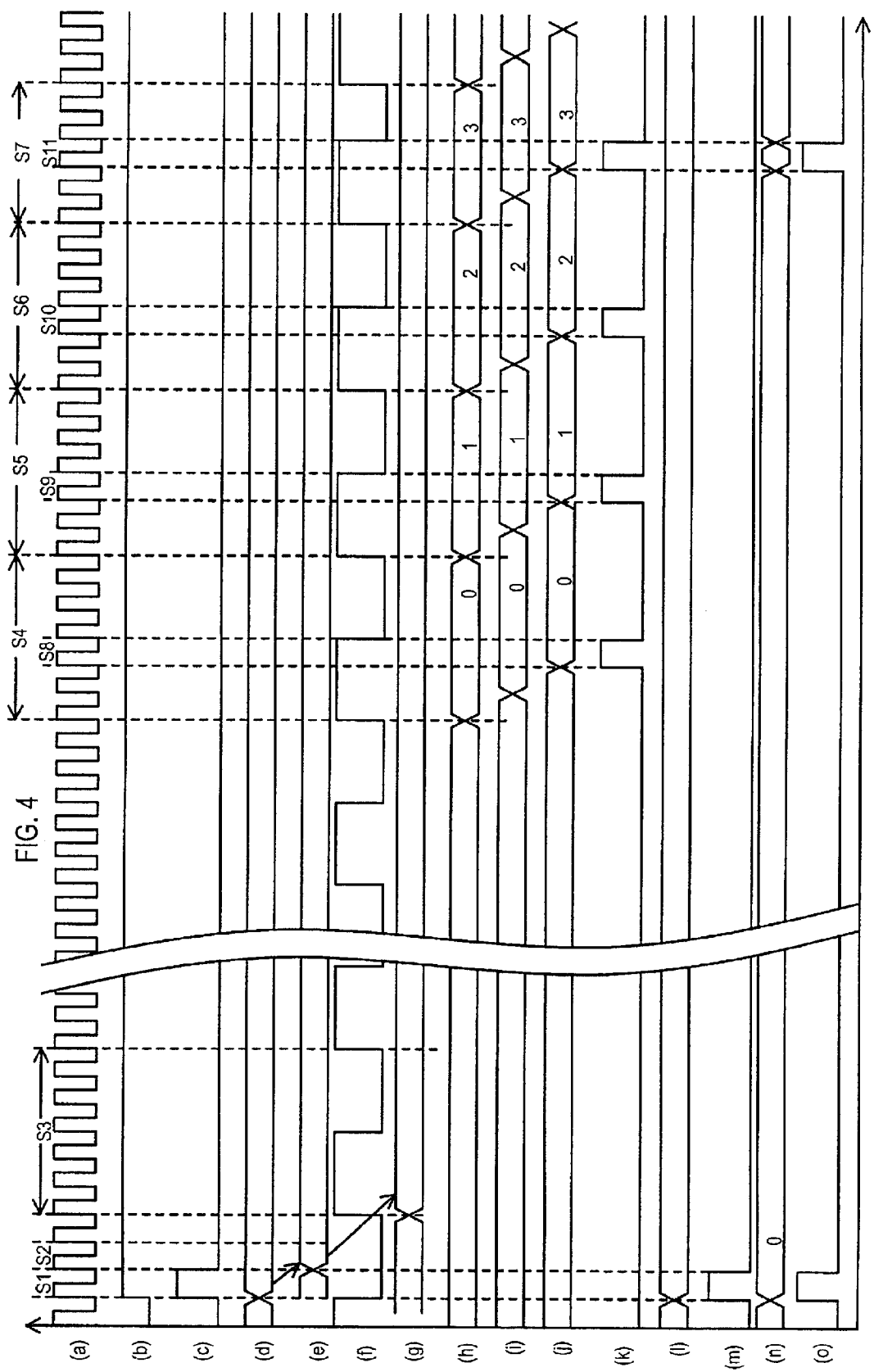
FIG. 4 is a timing diagram of a refill operation according to an embodiment.

Referring now to FIG. 4, a timing diagram of individual data at the time of a refill operation according to the embodiment of FIG. 3 is set forth.

The timing diagram of FIG. 4 may include a clock 1 shown as (a), a cache miss 300 shown as (b), a refill data request 110 to external memory shown as (c), an address 202 on cache shown as (d), an address 202 received by BIU shown as (e), a clock 2 shown as (f), a system bus 204 (BIU to memory) shown as (g), a system bus 206 (external memory to BIU) shown as (h), data 205 received by BIU shown as (i), data 205 on BIU—cache bus shown as (j), a write enable 121 to cache data portion shown as (k), write data 602 to cache TAG portion 102 shown as (l), write enable 600 to cache TAG portion 102 shown as (m), write data 609 to cache valid bit 103 shown as (n), and write enable 608 to cache valid bit 103 shown as (o).

In the example, it is assumed that CPU 130 is operating with a clock 1 (shown as (a) in FIG. 4). Comparator 107 may make a cache hit/miss judgment. Assuming comparator 107 judges that line 118 of cache memory 100 is a cache miss in this case, hit/miss result signal 300 (shown as (b) in FIG. 4) may become active (high) to indicated that a cache miss has been detected. The high value of hit/miss result signal 300 may be provided to CPU 130.

Then in a period S1, CPU 130 may provide BIU 201 a refill data request signal (pulse signal) 110 (shown as (c) in FIG. 4) and may request refill data from external memory 200 from the address (202) providing the cache miss.

At essentially the time as refill data request signal 110 (pulse signal) is output, OR gates (601 and 109) may, respectively, provide high write enables (600 and 608) (respectively shown as (m) and (o) in FIG. 4). Accordingly, valid data 604 may be written as write data 602 (shown as (l) in FIG. 4) into TAG portion 102 corresponding to line 118. Valid data 604 may correspond to an address (in external memory 200) where the refill data is located.

Further, at this time, because the refill process has not finished, control section 31 may provide a refill end signal 111 that is not active (inactive). In response to an inactive refill end signal 111, selector 610 may select invalid data 612 as write data 609 (shown as (o) in FIG. 4). In this way, valid bit 103 (corresponding to line 118 of cache memory 100 to be refilled) may be set to 0. In this way, the line 118 of cache memory 100 to be refilled has its corresponding valid bit 103 set to an invalid state.

Also in period S1, cache memory 100 may output the address (202) corresponding to the cache miss to bus 203 (shown as (d) in FIG. 4). In a subsequent cycle of clock 1, shown as period S2, BIU 201 may latch (or receive) address (202). In a period S3, clock 2 (shown as (f) in FIG. 4) may trigger BIU 201 to output address (202) to system bus 204 (shown as (g) in FIG. 4). In this way, external memory 200 may receive address (202). Clock 2 may be a frequency divided version of clock 1.

Then, in periods S4 to S7, refill data 205 corresponding to address (202) may be returned to BIU 201 from external memory 200 via system bus 206 (shown as (h) to (j) in FIG. 4). Also during periods S4 to S7, CPU 130 may output a write enable 121 (shown as (k) in FIG. 4) so that refill data 205 may be written into DATA portion 101 in the returned order in periods S8 to S11.

In period S11, the last refill data (3) may be written into data portion 101 and write enable 608 (shown as (o) in FIG. 4) may become active. Accordingly, valid data 611 may be written as write data 609 (shown as (n) in FIG. 4) into valid bit 103 corresponding to line 118. In this way, valid bit 103 corresponding to line 118 may be made valid.

According to cache memory control apparatus 30 of this embodiment, as apparent from the above, when a cache miss occurs in a line (for example line 118), valid bit 103 for the line 118 (line where the cache miss occurred or control section 31 determines line to be updated) may be made invalid. At about the same time, TAG portion 102 for line 118 may be updated with an address corresponding to a location of updated data in external memory 200. Valid bit 103 may be updated with write data 609 and thus made valid when refill data 205 has been written into the corresponding line 118. Valid bit 103 and TAG portion 102 may be updated under control of control section 31.

By making the line 118 where the cache miss occurred invalid (essentially at the time of the cache miss), even if resetting is done during writing of refill data 205, a partial line fill of refill data would not erroneously become valid cache data in the cache line (unlike in the conventional approach). In this way, cache data integrity may be maintained. Thus, a cache memory control apparatus 30 according to an embodiment may eliminate the necessity of making all lines of cache memory 100 invalid when resetting is done and the cache memory 100 may be recovered to the state before resetting in a shorter period of time.

According to the embodiments, as described above, when a cache miss occurs, a line (to be updated or refilled) of data in a cache may be set as invalid. A control apparatus may request refill data from external or main memory at the address corresponding to the cache miss. In this way, even if a reset operation is performed while refill data before refill data is completely written into the cache line, the cache state before the reset may be recovered as quickly as possible.

It is understood that the embodiments described above are exemplary and the present invention should not be limited to those embodiments. Specific structures should not be limited to the described embodiments.

Thus, while the various particular embodiments set forth herein have been described in detail, the present invention could be subject to various changes, substitutions, and alterations without departing from the spirit and scope of the invention. Accordingly, the present invention is intended to be limited only as defined by the appended claims.

What is claimed is:

1. A cache memory control apparatus for controlling read/write of data from/to a cache memory including multiple lines for storing data, comprising:

a control circuit which, when a cache miss occurs, provides a read request to an external memory from a cache miss address and makes a first line in the cache memory where refill data from the external memory is to be stored invalid wherein the control circuit sets a valid bit corresponding to the first line in the cache memory to an invalid state in response to the cache miss; and the control circuit sets a TAG address corresponding to the first line in the cache memory to an invalid address state in response to the cache miss.

2. The cache memory control apparatus according to claim 1, wherein:

the control circuit makes the first line valid when the refill data is stored in the first line.

3. The cache memory control apparatus according to claim 2, wherein:

the cache memory apparatus is included on a processor device.

4. The cache memory control apparatus according to claim 1, wherein:

the control circuit sets a TAG address corresponding to the first line in the cache memory to the cache miss address when the refill data is stored in the first line.

5. The cache memory control apparatus according to claim 1, wherein:

the control circuit sets a valid bit corresponding to the first line in the cache memory to a valid state when the refill data is stored in the first line.

6. A method for controlling a cache memory including multiple lines for storing data, comprising the steps of:

receiving a cache miss indication;

providing a refill request to refill a first line of the cache memory;

setting an invalid state for the first line of the cache memory in response to the refill request;

writing an address value corresponding to at least a portion of a refill request address provided to an external memory during the refill request to a TAG portion for the first line of the cache memory in response to the refill end; and writing an invalid address value to the TAG portion for the first line of the cache memory in response to the refill request.

7. The method for controlling a cache memory according to claim 6, further including the step of:

setting the first line of the cache memory to a valid state in response to a refill end.

8. The method for controlling a cache memory according to claim 6, further including the step of:

writing an address value corresponding to at least a portion of a refill request address provided to an external memory during the refill request to a TAG portion for the first line of the cache memory in response to the refill request.

9. The method for controlling a cache memory according to claim 6, wherein:

the steps of receiving a cache miss indication, providing a refill request to refill a first line of the cache memory, and setting an invalid state for the first line of the cache memory in response to the refill request are executed on an integrated circuit including a processor.

* * * * *